Figure 1:
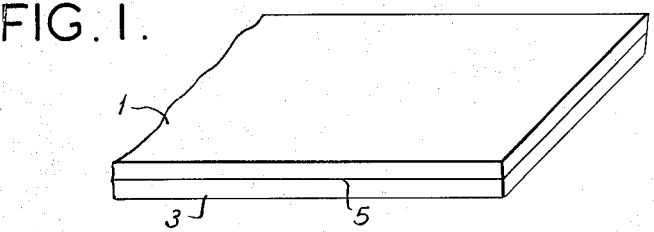

May 29, 1956 — H. W. BOESSENKOOL — 2,747,265
RECLAIMING SCRAP METAL
Filed June 29, 1951

Helmich W. Boessenkool,
Inventor.
Koenig and Pope,
Attorneys.

United States Patent Office 2,747,265
Patented May 29, 1956

2,747,265

RECLAIMING SCRAP METAL

Helmich W. Boessenkool, South Easton, Mass., assignor to Metals & Controls Corporation, Attleboro, Mass., a corporation of Massachusetts Application June 29, 1951, Serial No. 234,246

8 Claims. (Cl. 29—403)

This invention relates to the reclaiming of scrap metal, and more particularly to the reclaiming of the individual metals or composite multi-layer metal stock.

The principal object of the invention is the provision of a method for making easily possible the reclaiming or salvaging of the individual metals of composite multi-layer metal scrap such as results from removal of a part or parts of composite multi-layer metal stock. For example, it is often desired to manufacture articles from composite multi-layer sheet metal stock by cutting or punching blanks from such stock or by trimming it. This leaves composite multi-layer scrap. If the layers of the stock are initially permanently bonded together, in many instances it is economically impractical to salvage the scrap, because the different metals of the stock cannot be readily separated. If the scrap is discarded, however, the loss may be considerable.

This invention utilizes either the method of solid phase bonding disclosed in the copending application of Helmich W. Boessenkool and George Durst entitled "Solid Phase Bonding of Metals", Serial No. 204,346, filed January 4, 1951, eventuated as Patent 2,691,815, dated October 19, 1954, or the method of solid phase bonding disclosed in the copending application of Helmich W. Boessenkool, George Durst and Sidney Siegel, entitled "Solid Phase Bonding of Metals," Serial No. 204,646, filed January 5, 1951, to make possible the salvaging of individual metals of scrap by strictly mechanical operations, as opposed to chemical operations. Each of these applications discloses a method of solid phase bonding metals (bonding without the formation of any liquid phase material at the interface) involving the squeezing together of the metals to be bonded, as by rolling in a rolling mill for example, at such a temperature and with such reduction as to effect what is referred to therein as a "nucleal" bond. This bond, which is believed to result from the formation, under the conditions of temperature and pressure, of numerous minute discrete bonded areas, in each of which there is a metallic bond existing by virtue of the inter-atomic force field surrounding metal atoms, is sufficiently strong to hold the metals together with at least enough strength that they may be handled without coming apart, but of insufficient strength to prevent the metals from being intentionally peeled apart at their interface. Also, the nucleal bond is an incipient bond, such that by subjecting the nucleally bonded stock to a subsequent heat-treating operation, referred to as a "sintering" operation, the strength of the bond may be increased to the point where the metals cannot be readily peeled apart and hence are permanently bonded. According to my method of forming composite multi-layer metal stock and salvaging scrap resulting from removal of part of the stock, I first squeeze the metal layers together at such a temperature and with such a reduction as to effect the incipient bonding of the opposing faces of the metal layers across substantially the entire interfacial area with a bond of insufficient strength to prevent the metals from being intentionally peeled apart, and capable of having its strength increased by a subsequent heat treatment. Then I remove whatever part of the resultant multi-layer stock may be desired, with the consequent formation of multi-layer scrap. The layers of this scrap are only incipiently bonded, and hence may be readily peeled apart to salvage the individual metals. The non-scrap incipiently bonded multi-layer material may be subsequently subjected to a heat treatment to perfect the bond. Other features will be in part apparent and in part pointed out hereinafter.

The invention accordingly comprises the steps and sequence of steps, and features of manipulation, which will be exemplified in the methods hereinafter described, and the scope of which will be indicated in the following claims.

Figure 2:
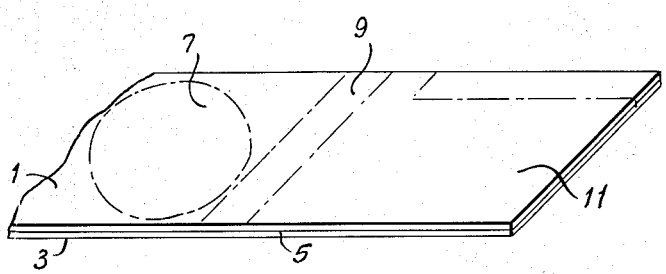
Figure 3:
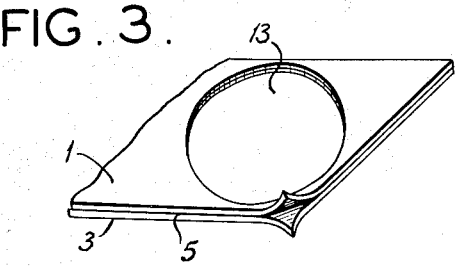

In the accompanying drawing, in which one of various possible embodiments of the invention is illustrated, Fig. 1 is a view showing two layers of metal prior to bonding;

Fig. 2 is a view showing the two layers of metal after they have been bonded in such manner as to form the incipient bond, illustrating the reduction in thickness effected in bonding, and also illustrating by means of dot-dash lines parts of the incipiently bonded stock to be removed; and, Fig. 3 is a view showing a piece of multi-layer scrap resulting from the removal of a part of the stock shown in Fig. 2, and illustrating how the layers of this scrap are peeled apart for salvaging purposes.

Similar reference characters indicate corresponding parts throughout the several views of the drawing.

Referring to the drawing, Fig. 1 shows two layers of metals 1 and 3 superimposed for bonding at their interface 5. In accordance with this invention, these layers are nucleally bonded in the manner disclosed in either of the aforesaid copending applications to form the nucleally bonded sheet metal stock illustrated in Fig. 2. This usually is accomplished by rolling the metals in a rolling mill at such temperature and with such a reduction in the combined cross section of the metals as to effect the nucleal bonding of the layers. For example, in accordance with the method disclosed in Patent 2,691,815, the metals may be rolled at a temperature below the temperature of recrystallization of the metal having the lowest temperature of recrystallization, and with a reduction of at least 30%. In this case the mating surfaces of the metals will have been prepared as described in Patent 2,691,815 to eliminate any barrier film which would otherwise act as a deterrent to bonding. Or, in accordance with the method disclosed in copending application Serial No. 204,646, the metals may be rolled at a temperature within the range just above the minimum recrystallization temperature of the metal having the lowest recrystallization temperature up to the highest temperature at which the metals may be deformed without any pulling apart or any formation of brittle compounds or liquid phase material at the interface, with a reduction such as to effect the nucleal bonding.

The layers 1 and 3 of the nucleally bonded composite stock shown in Fig. 2 are held together with enough strength that the stock may be handled, but with insufficient strength to prevent the layers from being intentionally peeled apart at the interface. Parts such as indicated at 7, 9 and 11 in Fig. 2 may then be cut or punched from the stock. Part 7, for example, is a circular blank. The cutting or punching is effected upon the stock in its nucleally bonded condition. This leaves multi-layer scrap, the layers of which are only incipiently bonded, not permanently bonded.

Fig. 3 illustrates a piece of scrap remaining from the punching out of the circular blank 7, showing the hole 13 resulting from punching out the blank. The layers 1 and 3 of this piece of scrap, being only incipiently bonded, may be readily peeled apart as illustrated. This may be accomplished, for example, by holding one layer, gripping the other with a pair of pliers, and manually tearing the layers apart. Thus the individual metals may be easily salvaged without any necessity for chemical operations. Parts which are to be used may be subsequently subjected to the heat treating or sintering operation, in the manner described in the aforesaid copending applicaitons, to increase the strength of the bond to the point where the layers are permanently bonded together.

It will be understood that the invention is applicable to stock which has more than two layers. The invention may be particularly desirable, for example, for use in the case of three-layer stock wherein the central layer is protected from chemical attack, in which case chemical removal or separation of the layers would be infeasible.

In view of the above, it will be seen that the several objects of the invention are achieved and other advantageous results attained.

As many changes could be made in the above methods without departing from the scope of the invention, it is intended that all matter contained in the above description or shown in the accompanying drawing shall be interpreted as illustrative and not in a limiting sense.

I claim:

1. The method of forming composite multi-layer metal stock and salvaging scrap resulting from removal of part of the stock, comprising the steps of squeezing the metal layers together at such temperature and with such reduction as to effect an incipient bonding of opposing faces of the metal layers across substantially the entire interfacial area of the metal layers, with a bond of insufficient strength to prevent the metal layers from being intentionally peeled apart and capable of being increased by a subsequent heat treatment at temperatures below that at which a liquid phase is formed at the interface, removing part of the resultant multi-layer stock with consequent formation of multi-layer scrap, the layers of which are only incipiently bonded, and peeling apart the layers of the scrap.

2. The method of forming composite multi-layer sheet metal stock and salvaging scrap resulting from removal of part of the stock, comprising the steps of rolling the metal layers together at such temperature and with such reduction as to effect an incipient bonding of opposing faces of the metal layers across substantially the entire interfacial area of the metal layers, with a bond of insufficient strength to prevent the metal layers from being intentionally peeled apart and capable of being increased by a subsequent heat treatment at temperatures below that at which a liquid phase is formed at the interface, removing part of the resultant multi-layer sheet metal stock with consequent formation of multi-layer sheet metal scrap, the layers of which are only incipiently bonded, and peeling apart the layers of the scrap.

3. The method of forming composite multi-layer metal stock and salvaging scrap resulting from removal of part of the stock, comprising the steps of squeezing the metal layers together at such temperature and with such reduction as to effect a solid phase nucleal bonding of opposing faces of the metal layers across substantially the entire interfacial area of the metal layers, with the nucleal bond of insufficient strength to prevent the metal layers from being intentionally peeled apart and capable of being increased by a subsequent heat treatment at temperatures below that at which a liquid phase is formed at the interface, removing part of the resultant multi-layer stock with consequent formation of multi-layer scrap, the layers of which are only nucleally bonded, and peeling apart the layers of the scrap.

4. The method of forming composite multi-layer sheet metal stock and salvaging scrap resulting from removal of part of the stock, comprising the steps of rolling the metal layers together at such temperature and with such reduction as to effect a solid phase nucleal bonding of opposing faces of the metal layers across substantially the entire interfacial area of the metal layers, with the nucleal bond of insufficient strength to prevent the metal layers from being intentionally peeled apart and capable of being increased by a subsequent heat treatment at temperatures below that at which a liquid phase is formed at the interface, removing part of the resultant multi-layer stock with consequent formation of multi-layer scrap, the layers of which are only incipiently bonded, and peeling apart the layers of the scrap.

5. The method comprising the steps of squeezing metal layers together at such temperature and with such reduction as to form multi-layer metal stock in which the opposing faces of the metal layers are incipiently bonded across substantially the entire interfacial area, the bond being of insufficient strength to prevent the metal layers from being intentionally peeled apart and capable of being increased by a subsequent heat treatment at temperatures below that at which a liquid phase is formed at the interface, removing part of the resultant multi-layer stock with consequent formation of multi-layer scrap and non-scrap, the layers of which are only incipiently bonded, peeling apart the incipiently bonded layers of the scrap, and subjecting the non-scrap to heat treatment to perfect its bond.

6. The method comprising the steps of rolling metal layers together at such temperature and with such reduction as to form multi-layer sheet metal stock in which the opposing faces of the metal layers are incipiently bonded across substantially the entire interfacial area, the bond being of insufficient strength to prevent the metal layers from being intentionally peeled apart and capable of being increased by a subsequent heat treatment at temperatures below that at which a liquid phase is formed at the interface, removing part of the resultant multi-layer sheet metal stock with consequent formation of multi-layer sheet metal scrap and non-scrap, the layers of which are only incipiently bonded, peeling apart the incipiently bonded layers of the scrap, and subjecting the non-scrap to heat treatment to perfect its bond.

7. The method comprising the steps of squeezing metal layers together at such temperature and with such reduction as to solid phase nucleally bond them into multi-layer stock in which the opposing faces of the metal layers are incipiently bonded across substantially the entire interfacial area a nucleal bond of insufficient strength to prevent the metal layers from being intentionally peeled apart and capable of being increased by a subsequent heat treatment at temperatures below that at which a liquid phase is formed at the interface, removing part of the resultant multi-layer stock with consequent formation of multi-layer scrap and non-scrap, the layers of which are only nucleally bonded, peeling apart the nucleally bonded layers of the scrap, and sintering the non-scrap to perfect its bond.

8. The method comprising the steps of rolling metal layers together at such temperature and with such reduction as to solid phase nucleally bond them into multi-layer sheet metal stock in which the opposing faces of the metal layers are incipiently bonded across substantially the entire interfacial area by a nucleal bond of insufficient strength to prevent the metal layers from being intentionally peeled apart and capable of being increased by a subsequent heat treatment at temperatures below that at which a liquid phase is formed at the interface, removing part of the resultant multi-layer stock with consequent formation of multi-layer scrap and non-scrap, the layers of which are only nucleally bonded, peeling apart the nucleally bonded layers of the scrap, and sintering the non-scrap to perfect its bond.

References Cited in the file of this patent

UNITED STATES PATENTS

| | | |
|---|---|---|
| 902,767 | Sheldon | Nov. 3, 1908 |
| 1,591,204 | Yordon | July 6, 1926 |
| 1,800,942 | Johnson | Apr. 14, 1931 |
| 2,234,214 | Young | Mar. 11, 1941 |
| 2,289,311 | Wellman | July 7, 1942 |
| 2,377,882 | Hensel | June 12, 1945 |
| 2,396,616 | Stather-Dunn | Mar. 12, 1946 |
| 2,471,663 | Tietz | May 31, 1949 |
| 2,567,012 | Donelan | Sept. 4, 1951 |
| 2,571,040 | Juvinall | Oct. 9, 1951 |
| 2,608,503 | Meyer | Aug. 26, 1952 |

OTHER REFERENCES

TyleCote, R. F.: "Pressure Welding," Transactions of The Institute of Welding, November 1945, pp. 163–178.

Cady, E. L.: "When Metal Atoms Wander," Scientific American, July 1947, pp. 15–17.